(12) United States Patent
Fukuchi

(10) Patent No.: US 10,310,810 B2
(45) Date of Patent: Jun. 4, 2019

(54) MEMORY SYSTEM AND METHOD FOR CONTROLLING NONVOLATILE MEMORY

(71) Applicant: Toshiba Memory Corporation, Minato-ku (JP)

(72) Inventor: Naoya Fukuchi, Tokyo (JP)

(73) Assignee: Toshiba Memory Corporation, Minato-ku (JP)

( * ) Notice: Subject to any disclaimer, the term of this patent is extended or adjusted under 35 U.S.C. 154(b) by 0 days.

(21) Appl. No.: 15/703,769

(22) Filed: Sep. 13, 2017

(65) Prior Publication Data

US 2018/0285073 A1    Oct. 4, 2018

(30) Foreign Application Priority Data

Mar. 30, 2017    (JP) ................................. 2017-066789

(51) Int. Cl.
  *G06F 13/38*    (2006.01)
  *G06F 5/10*     (2006.01)
  *G06F 3/06*     (2006.01)

(52) U.S. Cl.
  CPC .............. *G06F 5/10* (2013.01); *G06F 3/0656* (2013.01); *G06F 3/0659* (2013.01); *G06F 3/0679* (2013.01); *G06F 13/385* (2013.01)

(58) Field of Classification Search
  CPC combination set(s) only.
  See application file for complete search history.

(56) References Cited

U.S. PATENT DOCUMENTS

| 9,454,310 | B2 | 9/2016 | Tsai et al. |
| 2015/0081933 | A1 | 3/2015 | Vucinic et al. |
| 2015/0081947 | A1 | 3/2015 | Vucinic et al. |
| 2015/0081955 | A1 | 3/2015 | Vucinic et al. |
| 2015/0081956 | A1 | 3/2015 | Vucinic et al. |
| 2015/0177994 | A1 | 6/2015 | Vucinic et al. |
| 2016/0124876 | A1 | 5/2016 | Vucinic et al. |

FOREIGN PATENT DOCUMENTS

JP    2016-212580    12/2016

*Primary Examiner* — Yong J Choe
(74) *Attorney, Agent, or Firm* — Oblon, McClelland, Maier & Neustadt, L.L.P.

(57) ABSTRACT

A memory system including a nonvolatile memory and a controller configured to control the nonvolatile memory, and a method executed by the memory system, wherein the controller fetches a first command in a submission queue on a memory of a host to a first queue in the memory system and executes the first command, checks contents of a subsequent command in the submission queue or another submission queue while leaving the subsequent command in the submission queue or the other submission queue, fetches the subsequent command to a second queue in the memory system, and executes the subsequent command and the first command in parallel, when the subsequent command is a command executable during the execution of the first command.

10 Claims, 12 Drawing Sheets

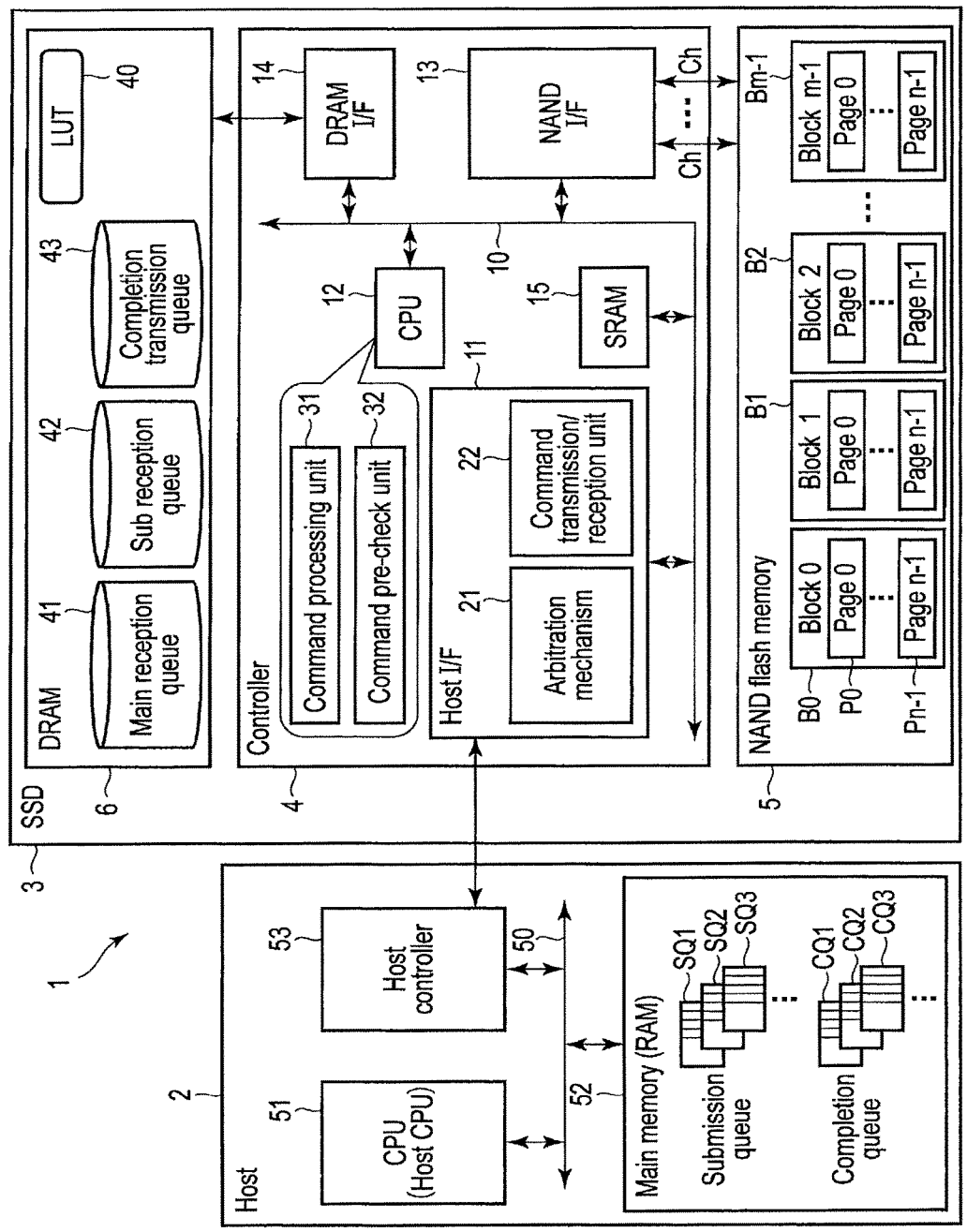
F I G. 1

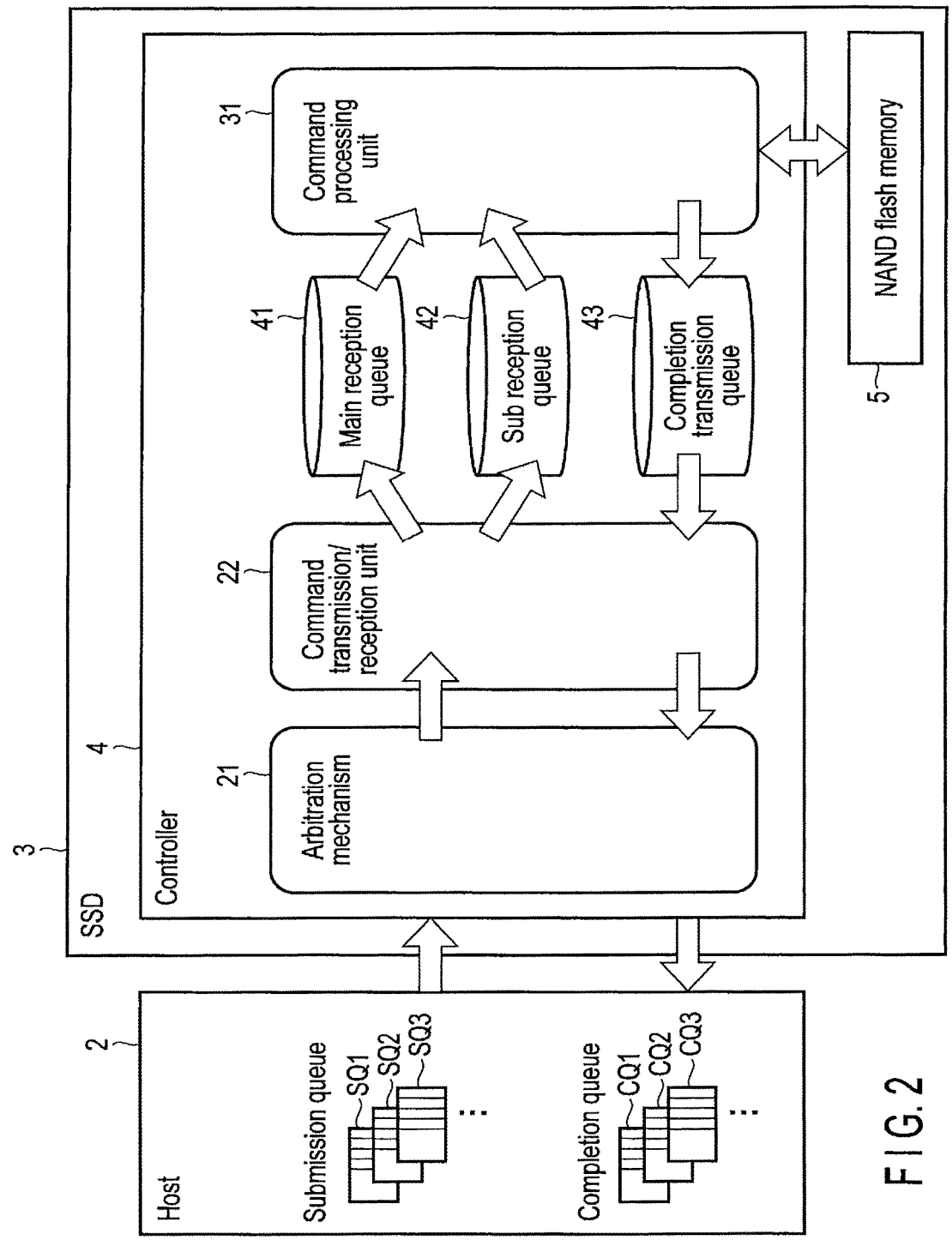
F I G. 2

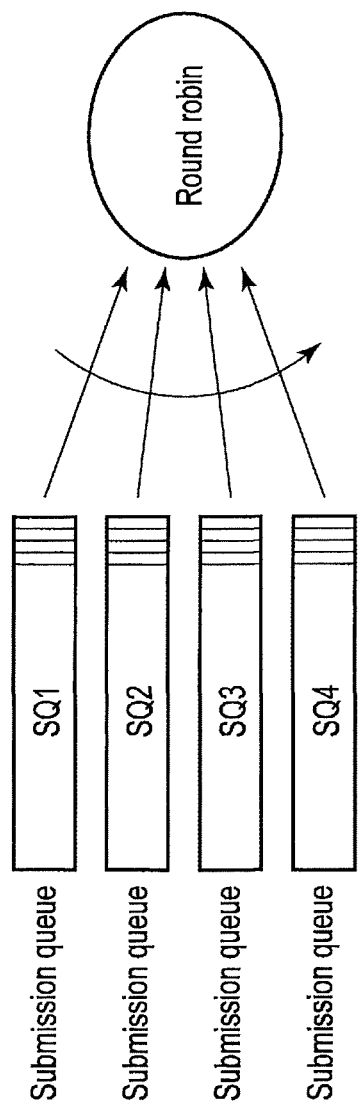
F I G. 3

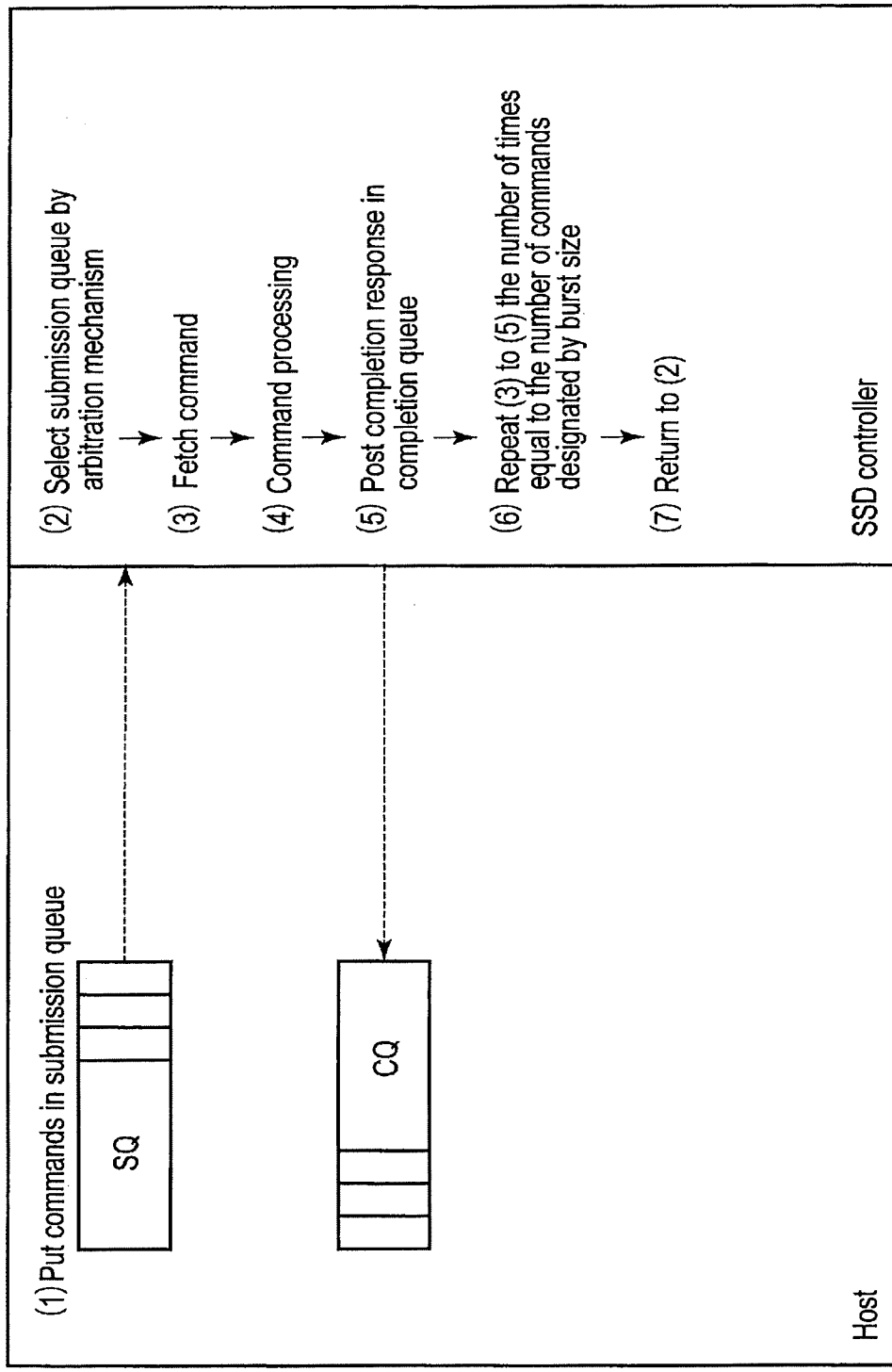
F I G. 6

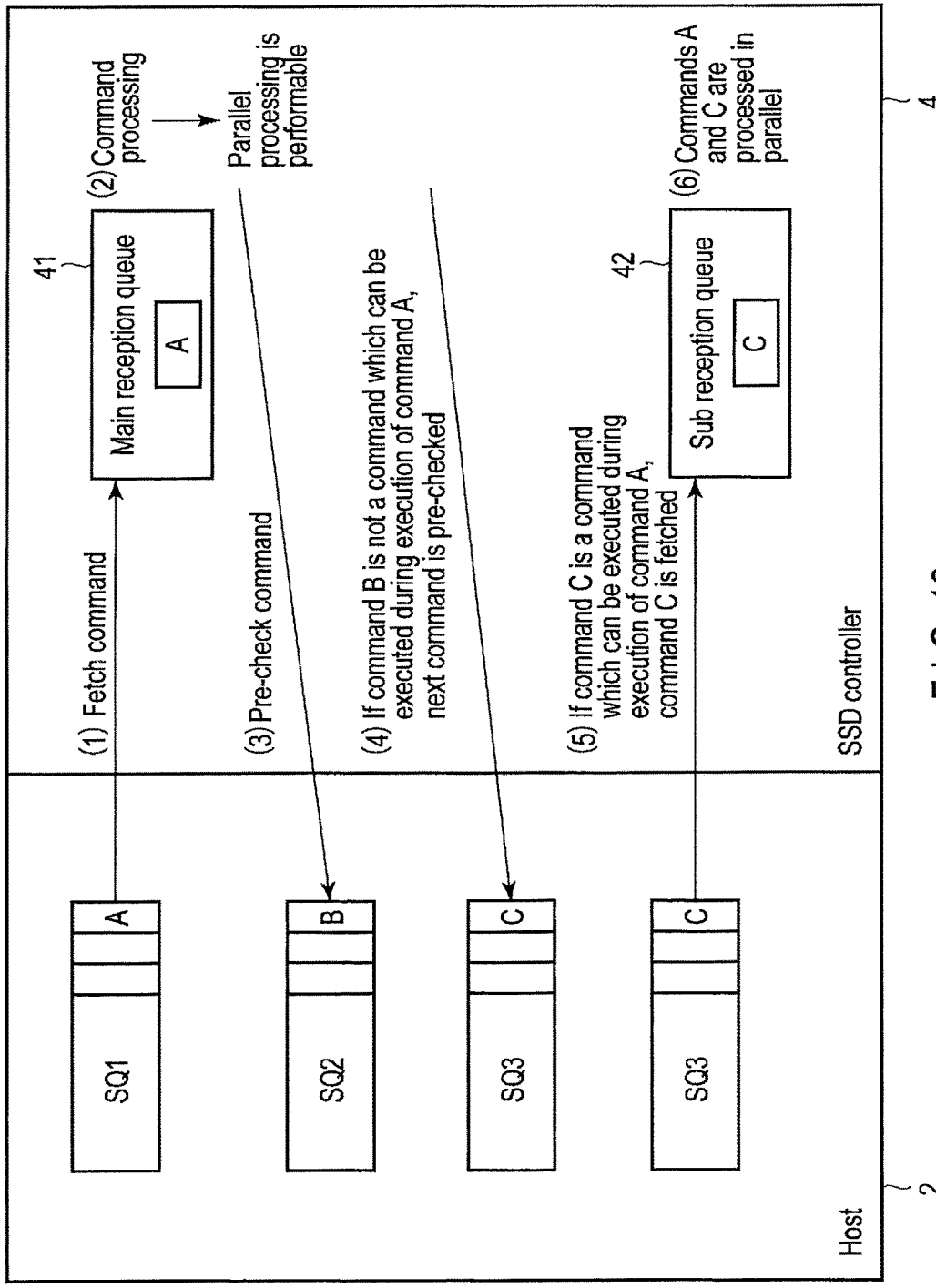
F I G. 10

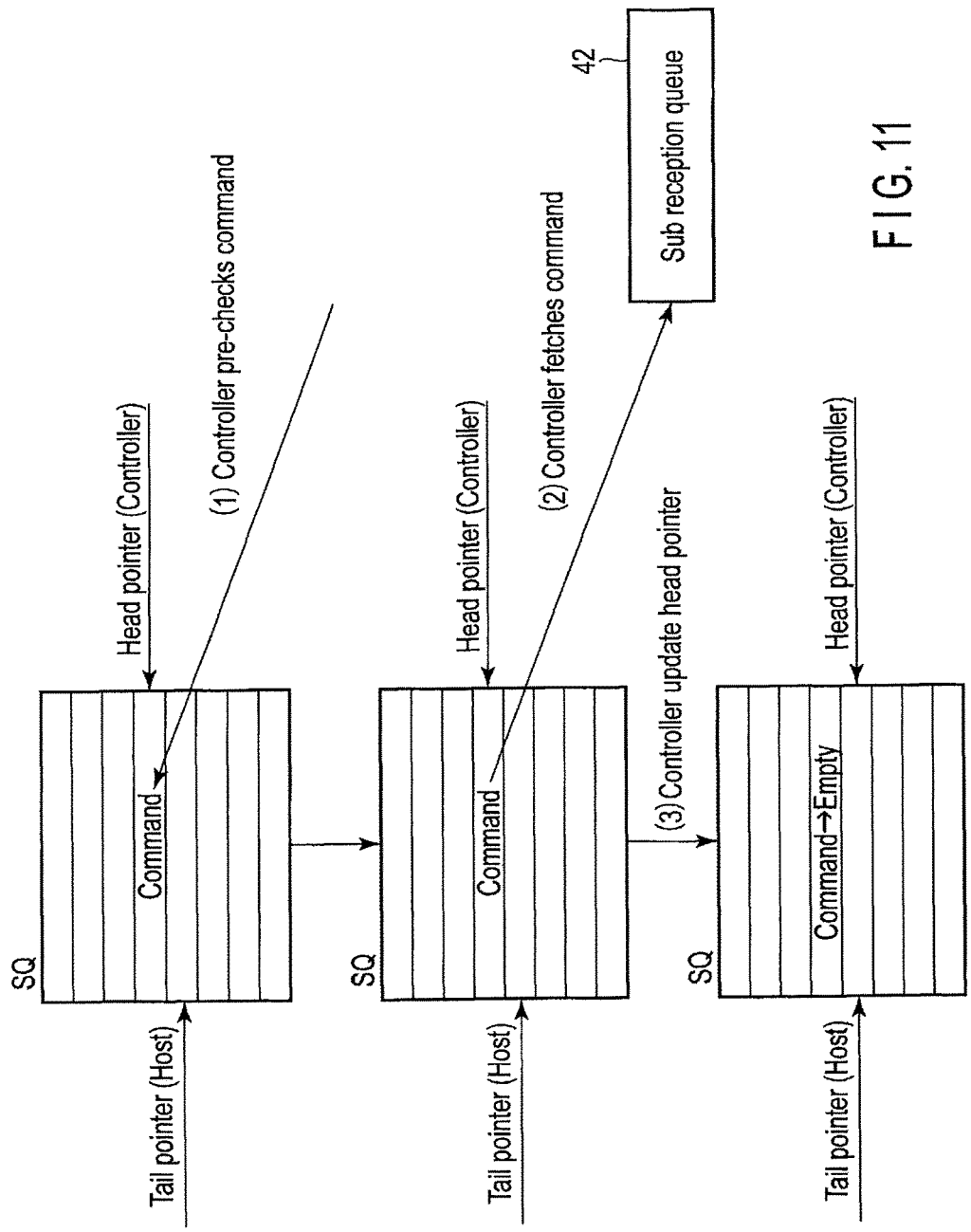
F I G. 11

MEMORY SYSTEM AND METHOD FOR CONTROLLING NONVOLATILE MEMORY

CROSS-REFERENCE TO RELATED APPLICATIONS

This application is based upon and claims the benefit of priority from Japanese Patent Application No. 2017-066789, filed Mar. 30, 2017, the entire contents of which are incorporated herein by reference.

FIELD

Embodiments described herein relate generally to a memory system including a nonvolatile memory and a method executed by the memory system.

BACKGROUND

In recent years, memory systems including a nonvolatile memory are widely used.

As one type of the memory systems, a solid state drive (SSD) including a NAND flash memory is known. SSD is used as a main storage of various computing devices.

Recently, in order to improve the performance of SSD, increasing a command handling function used to handle commands from a host is required.

Therefore, a memory system which can efficiently handle each command from a host is desired.

BRIEF DESCRIPTION OF THE DRAWINGS

FIG. 1 is a block diagram illustrating a configuration example of a memory system of an embodiment.

FIG. 2 is a block diagram illustrating an outline of a command processing executed by the memory system of the embodiment.

FIG. 3 is a block diagram illustrating an example of an arbitration mechanism which selects, from a plurality of submission queue queues on a host memory, a submission queue from which command is fetched.

FIG. 6 is a view illustrating a basis procedure of command processing.

FIG. 10 is a view illustrating another example of command processing including command pre-check, executed by the memory system of the embodiment.

FIG. 11 is a view illustrating a command pre-check operation executed by the memory system of the embodiment.

DETAILED DESCRIPTION

Figure 4:
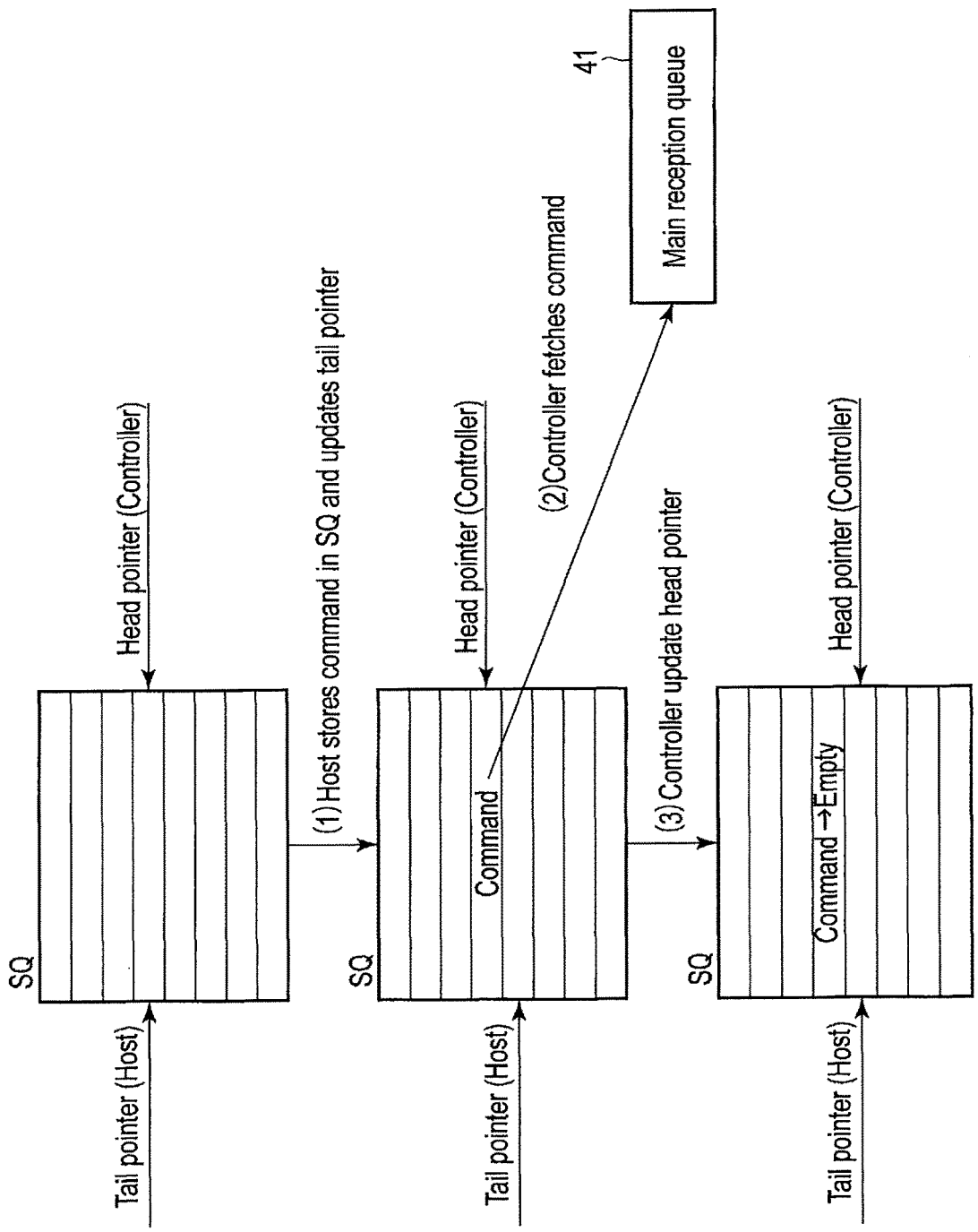
FIG. 4 is a view illustrating an operation of fetching a command which is put in the submission queue, executed by the memory system of the embodiment.

Various embodiments will be described hereinafter with reference to the accompanying drawings.

In general, according to one embodiment, a memory system is connectable to a host. The memory system includes a nonvolatile memory and a controller. The controller is electrically connected to the nonvolatile memory and is configured to control the nonvolatile memory. The controller fetches a first command in a submission queue on a memory of the host to a first queue in the memory system, executes the first command. The controller checks contents of a subsequent command in the submission queue or another submission queue on the memory of the host during the execution of the first command while leaving the subsequent command in the submission queue or said another submission queue. When the subsequent command is a command executable during the execution of the first command, the controller fetches the subsequent command from the submission queue or said another submission queue to a second queue in the memory system, and executes the subsequent command and the first command in parallel.

Initially, the structure of an information processing system 1 including a memory system of an embodiment will be explained with reference to FIG. 1.

The memory system is a semiconductor storage device configured to write data in a nonvolatile memory and to read data from the nonvolatile memory. The memory system may be realized as a solid state drive (SSD) 3 including a NAND flash memory.

The information processing system 1 includes a host (host device) 2 and SSD 3. The host 2 is an information processing apparatus (computing device) configured to access the SSD 3. The host 2 may be a storage server (server) or may be a personal computer.

The SSD 3 may be used as a main storage of the information processing apparatus functioning as the host 2. The SSD 3 may be stored in the information processing apparatus or may be connected to the information processing apparatus through a cable or a network.

As an interface for interconnecting the host 3 and SSD 3, NVM express (NVMe) (registered trademark), SCSI, serial attached SCSI (SAS), ATA, serial ATA (SATA), Ethernet (registered trademark), fibre channel, etc., may be used.

The SSD 3 includes a controller 4 and nonvolatile memory (NAND flash memory) 5. The SSD 3 may include a random access memory, for example, DRAM 6.

The NAND flash memory 5 includes a memory cell array including a plurality of memory cells arranged in a matrix. The NAND flash memory 5 may be a NAND flash memory of two-dimensional structure or a NAND flash memory of three-dimensional structure.

The memory cell array of the NAND flash memory 5 includes a plurality of blocks B0 to Bm−1. The blocks B0 to Bm−1 each include a large number of pages (here, pages P0 to Pn−1). The blocks B0 to Bm−1 are units of erase operation. A block may be referred to as an "erase block" or a "physical block". The pages P0 to Pn−1 each include a plurality of memory cells connected to same word line. The pages P0 to Pn−1 are units of data write operation and data read operation.

The controller 4 is electrically connected to the NAND flash memory 5 as a nonvolatile memory through a NAND flash interface 13 such as toggle, or open NAND flash interface (ONFI). The NAND interface 13 functions as a NAND control circuit configured to control the NAND flash memory 5. The NAND flash memory 5 may include a plurality of NAND flash memory chips. The NAND interface 13 may be connected to the NAND flash memory chips through a plurality of channels.

The controller 4 controls operations (write (program) operation, read operation, erase operation, etc.) of the NAND flash memory 5 using the NAND interface 13. The write (program) operation is an operation to write data corresponding to one page to a page of write target. The read operation is an operation to read data corresponding to one page from a page of read target. The erase operation is an operation to make the entire memory cells in a certain block an erased state.

The controller 4 may function as a flash translation layer (FTL) configured to execute data management and block management of the NAND flash memory 5. The data management executed by FTL includes (1) management of mapping information indicative of a corresponding relationship between logical addresses and physical addresses of the NAND flash memory 5, and (2) processing for hiding read/write operations performed in units of pages and an erase operations performed in units of blocks. The logical address is an address used by a host for address the SSD 3. As the logical address, LBA (a logical block address (addressing)) can be used.

The management of mapping between the logical addresses and the physical addresses is executed by using a look-up table (LUT) 40 functioning as an address translation table (logical-to-physical address translation table). The controller 4 uses the lookup table (LUT) 40 and manages mapping between the logical addresses and the physical addresses in units of predetermined management sizes. A physical address corresponding to a certain logical address indicates the latest physical location in the NAND flash memory 5 to which data of the logical address is written. The lookup table (LUT) 40 may be loaded to the DRAM 6 from the NAND flash memory 5 when the SSD 3 is powered on.

Data write to a page is performable only once per erase cycle. Thus, the controller 4 writes update data corresponding to a certain logical address to a physical location different from a physical location where previous data corresponding to this logical address is stored. Then, the controller 4 updates the lookup table (LUT) 40 and associates this logical address with the different physical location.

In the block management, management of bad blocks, wear leveling, garbage collection, and the like are included.

The controller 4 may include a host interface 11, CPU 12, NAND interface 13, DRAM interface 14, SRAM 15, etc. The CPU 12, NAND interface 13, DRAM interface 14, and SRAM 15 may be interconnected via a bus 10.

The host interface 11 receives various commands from the host 2. The host interface 11 includes an arbitration mechanism 21 and a command transmission/reception unit 22. The arbitration mechanism 21 is a mechanism to select, from a plurality of submission queues on a memory of the host 2, a submission queue from which a command is fetched. The arbitration mechanism 21 may be a round robin arbitration mechanism or may be a weighted round robin arbitration mechanism. The command transmission/reception unit 22 executes, under the control of the CPU 12, a process of receiving a command from the submission queue selected by the arbitration mechanism 21 and a process of posting response of command completion in a completion queue on the memory of the host 2. A response of command completion is a notice of completion to notify a status indicative of success/failure of processing of the command to the host 2. A response of command completion corresponding to a certain command is posted in the completion queue corresponding to the submission queue from which the command is taken.

The CPU 12 is a processor configured to control the host interface 11, NAND interface 13, DRAM interface 14, and SRAM 15. In response to turning on of the SSD 3, the CPU 12 loads control program (firmware) stored in the NAND flash memory 5 or a ROM which is not shown to the SRAM 15 or the DRAM 6. The CPU 12 executes the firmware to perform various processes.

In addition to the above FTL processing, the CPU 12 can execute command processing to process various commands from the host 2. The operation of the CPU 12 is controlled by the above firmware executed by the CPU 12.

The CPU 12 can function as a command processing unit 31 and a command pre-check unit 32.

The command processing unit 31 processes various commands from the host 2. The types of commands can be roughly divided into I/O commands and management commands. For example, I/O commands include a write command, read command, and compare command.

A write command is a command to request the SSD 3 to write data. The write command includes, as its command parameters, an LBA (starting LBA) to which data are written, transfer length (data length), address information (data pointer) indicative of a location on the memory of the host 2 where the data to be written (write data) exists, and the like. The LBA is represented by serial number applied to logical sectors (logical blocks). The serial number starts from zero.

Upon reception of the write command, the command processing unit 31 acquires the write data from the memory of the host 2 and writes the write data to the NAND flash memory 5. Then, after completion of processing of the write command, the command processing unit 31 transmits a response of command completion with a status indicative of success or failure of the write command to the host 2.

The read command is a command to request the SSD 3 to read data. The read command includes, as its command parameters, an LBA (starting LBA) of data to be read, transfer length (data length), address information (data pointer) indicative of a location on the memory of the host 2 to which read data is transmitted, and the like.

Upon reception of the read command, the command processing unit 31 reads data designated by the read command from the NAND flash memory 5. Then, the command processing unit 31 transmits the read data and a response of command completion to the host 2. The response of command completion includes a status indicative of success or failure of the read command.

The compare command is a command to request the SSD 3 to read data corresponding to an LBA range designated by the compare command from the NAND flash memory 5 and to compare the read data to a comparison data designated by the compare command.

Upon reception of the compare command, the command processing unit 31 reads the data corresponding to the LBA range designated by the compare command from the NAND flash memory 5. Then, the command processing unit 31 compares the read data to the comparison data designated by the compare command. If the read data are equal to the comparison data, the compare command is successfully completed. The command processing unit 31 transmits a response of command completion including a status indicative of success or failure to the host 2.

Management commands include various commands such as a command to request creation or deletion of the submission queue/completion queue to the SSD 3 (create I/O submission queue command and delete I/O submission queue command), command to acquire various internal setting information from the SSD 3 (identify command), and command to request the SSD 3 to abort a specific command previously submitted to a submission queue (abort command).

The command processing unit 31 uses the command transmission/reception unit 22 to fetch commands orderly from a submission queue selected by the arbitration mechanism 21. Here, fetching means an operation to acquire commands from a memory (here, a memory of the host 2). The commands fetched (acquired) from the memory are posted in a local reception queue in the SSD 3. The command processing unit 31 can execute these fetched commands in any order.

The commands fetched from the submission queue are posted in a main reception queue 41 which is a local reception queue in the SSD 3. The command processing unit 31 may execute the commands in the main reception queue 41 serially. For example, when a command in the main reception queue 41 is executed completely, the command processing unit 31 may execute a next command in the main reception queue 41.

Time required to execute each command depends on contents of each command (for example, a data length corresponding to write command/read command) and an internal condition of the NAND flash memory 5. For example, a relatively long time (command execution time) may be required in order to execute a write command with a long data length. Furthermore, a command execution time of a compare command of comparative data with a long data length may become relatively long.

Thus, during the execution of the current command with a long command execution time, the command processing unit 31 may fetch a subsequent command from the submission queue from which the current command is fetched or another submission queue. The subsequent command fetched here is posted in a sub reception queue 42 instead of the main reception queue 41. The sub reception queue 42 is an additional local reception queue in the SSD 3. Generally, there is no unprocessed command in the sub reception queue 42, and thus, the command processing unit 31 can immediately start processing of analysis of the subsequent command posted in the sub reception queue 42. The command processing unit 31 analyzes the subsequent command posted in the sub reception queue 42 in order to determine whether or not the subsequent command is a command which is executable during the execution of the current command. Here, if the subsequent command is a command which is executable during the execution of the current command, the subsequent command is executed in parallel to the current command. Thus, the command handling function in the SSD 3 can be improved.

However, subsequent commands fetched in the sub reception queue 42 may not a command which is executable during the execution of the current command.

For example, in a case where a command currently executed is a compare command and a subsequent command fetched in the sub reception queue 42 is a write command which requires data write in an LBA range which overlaps a LBA range designated by the compare command, such a subsequent command may be handled as a command which is not executable during the execution of the current command. This is because the execution of the write command during the execution of the current command may possibly update comparative data stored in the NAND flash memory 5.

Furthermore, for example, in a case where a command currently executed is a command fetched from a submission queue (for example, SQ1) and a subsequent command fetched in the sub reception queue 42 is a command which requires deletion of the submission queue SQ1 or a completion queue CQ1 corresponding to the submission queue SQ1, such a subsequent command may be handled as a command which is not executable during the execution of the current command.

As can be understood from the above, if a subsequent command fetched in the sub reception queue 42 is a command which is not executable during the execution of the current command, the subsequent command cannot be executed until the execution of the current command is completed.

As a result, a process of switching a reception queue for the execution between the main reception queue 41 and the sub reception queue 42 occurs frequently.

For example, when execution of a current command is completed, the command processing unit 31 is required to switch a reception queue for execution to the sub reception queue 42 from the main reception queue 41 in order to execute a subsequent command in the sub reception queue 42. Then, when execution of the subsequent command in the sub reception queue 42 is completed, the command processing unit 31 is required to again switch the reception queue for execution to the main reception queue 41 from the sub reception queue 42 in order to execute a different subsequent command in the main reception queue 41.

An overhead process for switching the reception queue for execution may cause deterioration of the performance of the SSD 3.

Generally, processing of each command is required to be completed within a preset time (command timeout value). If a period of time required from fetching of a command from a submission queue to receiving a response of command completion (command execution time) exceeds a present command timeout value, a serious system error may possibly occur.

As described above, if a subsequent command fetched in the sub reception queue 42 is not a command which is executable during the execution of the current command, the subsequent command is not executed until the completion of the current command. It means that a command execution time which can be allocated to the processing of the subsequent command is practically reduced.

As can be understood from the above, a structure where a subsequent command in a submission queue is fetched to the sub reception queue 42 during execution of a command may be affected by frequent switching of a reception queue for execution and a reduced command execution time of the subsequent command.

Thus, in the present embodiment, a command pre-check unit 32 is provided.

The command pre-check unit 32 checks, during execution of a current command (command A), that is, during a time waiting completion of processing of the command (command A), contents (for example, command types, etc.) of a subsequent command (command B) in the same submission queue or a different submission queue while maintaining the subsequent command (command B) in the same submission queue or the different submission queue. Here, checking the contents of a subsequent command while maintaining the subsequent command in the same submission queue or in a different submission queue means checking the contents of the subsequent command in the same submission queue or the different submission queue without actually fetching the subsequent command from the same submission queue or the different submission queue in a queue in the SSD 3 (sub reception queue 42). Thus, the contents of the subsequent command can be checked while the subsequent command itself is maintained in the same submission queue or the different submission queue, and whether or not the subsequent command (command B) is a command which is executable during the execution of the current command (command A) can be determined.

If the command pre-check unit 32 determines that the subsequent command (command B) is a command which is executable during the execution of the command (command A), the command processing unit 31 fetches the subsequent command (command B) from the submission queue. The subsequent command (command B) fetched is posted in the sub reception queue 42. Then, the command processing unit 31 executes the subsequent command (command B) and the command (command A) in parallel. Here, executing the command A and the command B in parallel is not sequential execution of the commands A and B such as executing the command B after the completion of execution of the command A but is executing the command B during the execution of the command A such that the processing period (execution time) of the command B at least partly overlaps the processing period (execution time) of the command A. Typically, the execution of the command B starts without waiting for the completion of the execution of the command A. As a matter of course, the commands A and B may be executed substantially at the same time.

If the subsequent command (command B) is not a command which is executable during the execution of the command (command A), the command processing unit 31 does not fetch the subsequent command (command B) and keeps the subsequent command (command B) in the submission queue.

As can be understood from the above, in the present embodiment, only if the subsequent command (command B) is a command which is executable during the execution of the command (command A), the subsequent command (command B) is fetched from the submission queue to the sub reception queue 42.

Thus, a command which is not executable during the execution of the command (command A) is prevented from being fetched from a submission queue to the sub reception queue 42. As a result, frequency of switching of the reception queue for execution can be lowered. Furthermore, unless a subsequent command (command B) is fetched from a submission queue, a timer to count a timeout value of the command B is not started. Thus, a command execution time which can be allocated to the processing of the command B can be prevented from being shortened.

The DRAM interface 14 is a DRAM controller configured to perform access controlling of the DRAM 6. A storage area of the DRAM 6 is used to store a lookup table (LUT) 40, main reception queue 41, sub reception queue 42, and completion transmission queue 43. Or, the lookup table (LUT) 40, main reception queue 41, sub reception queue 42, and completion transmission queue 43 may be kept on, instead of DRAM 6, the SRAM 15 which is a random access memory in the controller 4.

Now, the structure of the host 2 will be explained.

The host 2 includes a CPU (host CPU) 51, main memory 52, and host controller 53, for example. The CPU 51, main memory 52, and host controller 53 are interconnected through a bus 50.

The CPU 51 is a processor configured to control components in the host 2. The CPU 51 executes software (host software) loaded from the SSD 3 or a different storage device to the main memory 52. The host software includes program controlling the SSD 3.

The main memory 52 is a random access memory (RAM) such as a DRAM. A part of the storage area of the main memory 52 is used to store one or more submission queues SQ, and one or more completion queues CQ corresponding to the submission queues SQ. The submission queue SQ is a queue used for issuance of commands by the host 2. The completion queue CQ is a queue used for notification of command completion to the host 2 by the controller 4 of the SSD 3. On the main memory 52, there are one or more queue pairs each including a submission queue SQ and a completion queue CQ. FIG. 1 shows an example where a plurality of submission queues SQ1, SQ2, SQ3 . . . , and a plurality of completion queues CQ1, CQ2, and CQ3 . . . which correspond to the submission queues SQ1, SQ2, SQ3 . . . are on the main memory 52.

Commands generated by the host software are put in any of submission queues SQ. Types of the commands are, as explained above, I/O commands and management commands. Submission queue in which the management commands are put is admin submission queue (ASQ) which is different from submission queues in which the I/O commands are put (I/O submission queues). Completion queue in which completion responses of the management commands are put is admin completion queues (ACQ) which is different from completion queues in which completion responses of the I/O commands are put (I/O completion queues). The queue pairs SQ and CQ of the main memory 52 include at least a queue pair of ASQ and ACQ. The host 2 can generate a queue pair of a submission queue SQ (I/O submission queue) and a completion queue CQ (I/O completion queue), if need be.

The host controller 53 is a controller configured to interface with the SSD 3. The host controller 53 may be stored in the CPU 51.

FIG. 2 shows an outline of command processing.

Commands issued by the host software are put in any of submission queues SQ1, SQ2, SQ3 . . . . One of submission queues SQ1, SQ2, SQ3 . . . is selected by the arbitration mechanism 21. IF the arbitration mechanism 21 is a round robin arbitration mechanism, the arbitration mechanism 21 may be configured as shown in FIG. 3. FIG. 3 shows an example where four submission queues SQ1, SQ2, SQ3, and SQ4 are on the main memory 52 of the host 2. The arbitration mechanism 21 selects submission queues SQ1, SQ2, SQ3, and SQ4 orderly. Commands are fetched from the submission queue selected by the arbitration mechanism 21. The maximum number of the commands fetched from the selected submission queue may be designated by a burst size (arbitration burst). The commands of number designated by the burst size are fetched from the selected submission queue orderly, and then, a next submission queue is selected by the arbitration mechanism 21.

Each command fetched from the selected submission queue is sent to the main reception queue 41 or the sub reception queue 42 through the command transmission/reception unit 22 and post in the main reception queue 41 or the sub reception queue 42. Generally, each command fetched is posted in the main reception queue 41. Only when a command pre-checked by the command pre-check unit 32 is fetched from a submission queue, the command is post in the sub reception queue 42.

The commands in the main reception queue 41/sub reception queue 42 are executed by the command processing unit 31.

If the command to be executed is a write command, the command processing unit 31 acquires write data designated by the write command from the main memory 52 of the host 2 and writes the write data to the NAND flash memory 5. After the completion of processing of the write command, a response of command completion is put in the completion transmission queue 43 by the command processing unit 31. Then, the response of command completion is posted in the completion queue CQ corresponding to the selected submission queue through the command transmission/reception unit 22.

If the command to be executed is a read command, the command processing unit 31 reads data designated by the read command from the NAND flash memory 5. After the completion of processing of the read command, a response of command completion is put in the completion transmission queue 43 by the command processing unit 31. Then, the read data are transmitted to the main memory 52 of the host 2 and the response of command completion is posted in the completion queue CQ corresponding to the selected submission queue through the command transmission/reception unit 22.

FIG. 4 shows an operation of fetching a command in a submission queue SQ.

The submission queue SQ may be a circular buffer (circular queue) including a plurality of entries of fixed size. Each entry is used to store a command. In an entry storing a certain command, an operation code of the command, identifier of the command, identifier of this submission queue SQ, and various command parameters of the command are stored.

The submission queue SQ is controlled by a tail pointer and a head pointer which correspond to the submission queue SQ.

The tail pointer is a pointer which points an entry in a submission queue SQ in which a next command is put. A value of the tail pointer is updated by the host 2. The head pointer is a pointer which points an entry in a submission queue SQ from which a next command is fetched. A value of the head pointer is updated by the controller 4 of the SSD 3. If the value of the tail pointer is equal to the value of the head pointer, the submission queue SQ is empty.

(1) The host 2 generates a command and stores the command in the entry in the submission queue SQ pointed by the tail pointer. Here, the host 2 notifies that new command is posted in the submission queue SQ to the controller 4 of the SSD 3 by updating (increments) the value of the tail pointer. In the process of updating the value of tail pointer, the host 2 writes the updated value of tail pointer in a register in the controller 4 (doorbell tail register corresponding to the submission queue SQ), and thereby notifies the updated value of tail pointer to the controller 4 of the SSD 3. A difference between the updated value of tail pointer and the current head pointer indicates the number of new commands posted in the submission queue SQ.

(2) The controller 4 of the SSD 3 fetches a command from the entry in the submission queue SQ pointed by head pointer and stores the fetched command in the main reception queue 41.

(3) When the command is fetched from the entry in the submission queue SQ, the controller 4 of the SSD 3 updates (increments) the value of head pointer and releases the entry pointed by a past value of head pointer. The host 2 handles the entry pointed by the past value of head pointer as an empty entry.

Figure 5:
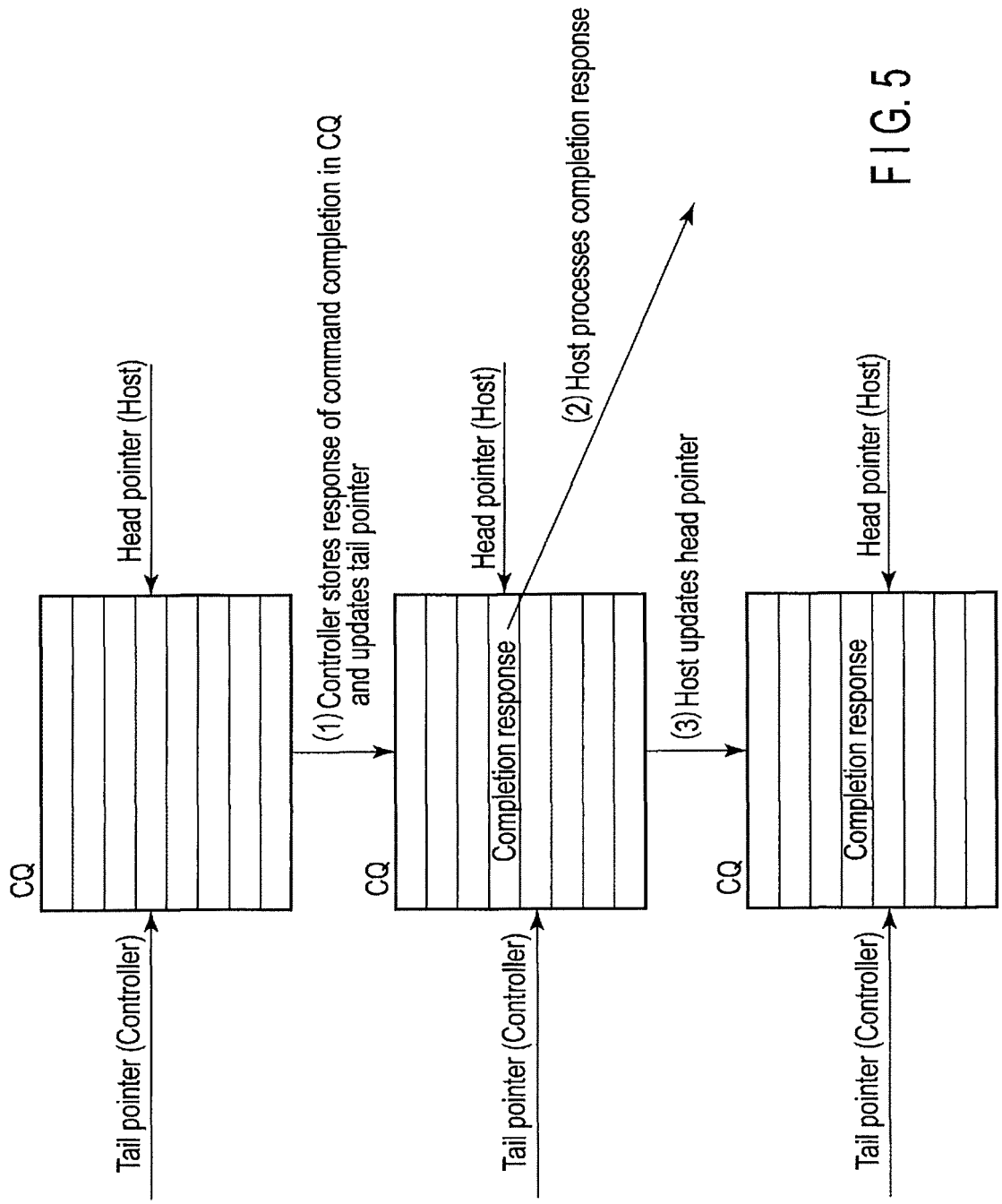
FIG. 5 is a view illustrating an operation of posting responses of command completion in a completion queue, executed by the memory system of the embodiment.

FIG. 5 shows an operation of posting a response of command completion in a completion queue.

The completion queue CQ may be a circular buffer (circular queue) including a plurality of entries of fixed size as well. Each entry is used to store a completion response (notice of completion). The completion queue CQ is controlled by a tail pointer and a head pointer which correspond to the completion queue CQ. The tail pointer is a pointer which points an entry in the completion queue CQ in which a next completion response is put. A value of tail pointer is updated by the controller 4 of the SSD 3. The head pointer is a pointer which points an entry in the completion queue CQ in which a next completion response to be processed is stored. A value of the head pointer is updated by the host 2. If the value of the tail pointer is equal to the value of the head pointer, the completion queue CQ is empty.

(1) The controller 4 generates a completion response (notices of completion) and stores the completion response in an entry in the completion queue CQ pointed by the tail pointer. The controller 4 notifies that a new completion response is posted in the completion queue CQ to the host 2 by updating (increments) the value of the tail pointer. In the process of updating the value of tail pointer, the controller 4 writes the updated value of tail pointer in a register in the controller 4 (doorbell tail register corresponding to the completion queue CQ), and thereby notifies the updated value of tail pointer to the host 2. A difference between the updated value of tail pointer and the current head pointer indicates the number of new completion responses posted in the completion queue CQ.

(2) The host 2 acquires a completion response from the entry in the completion queue CQ pointed by head pointer and processes the acquired completion response.

(3) The host 2 updates (increments) the value of head pointer.

FIG. 6 shows a basic flow of command processing.

(1) The host 2 puts a new command in a submission queue SQ. Then, the host 2 writes an updated value of tail pointer in a doorbell tail register corresponding to the submission queue SQ, and thereby notifies to the controller 4 of the SSD 3 that the new command is put in the submission queue SQ.

(2) The controller 4 of the SSD 3 selects a submission queue SQ from which a command is fetched using the arbitration mechanism 21.

(3) The controller 4 of the SSD 3 fetches a command from the selected submission queue SQ.

(4) The controller 4 of the SSD 3 analyzes the fetched command and processes the command.

(5) After completion of processing (execution) of the command, the controller 4 of the SSD 3 posts a completion response in a completion queue CQ corresponding to the submission queue SQ and notifies that a new completion response is posted in the completion queue CQ.

(6) The controller 4 of the SSD 3 repeats the steps (3) to (5) with respect to the same submission queue SQ the preliminarily determined number of times. The number of times is equal to the number of commands designated by burst size. Note that, fetching of commands may be executed for the burst size at once. In that case, the controller 4 of the SSD 3 fetches commands of number designated by the burst size from the same submission queue SQ at once.

(7) The process executed by the controller 4 returns to (2).

Figure 7:
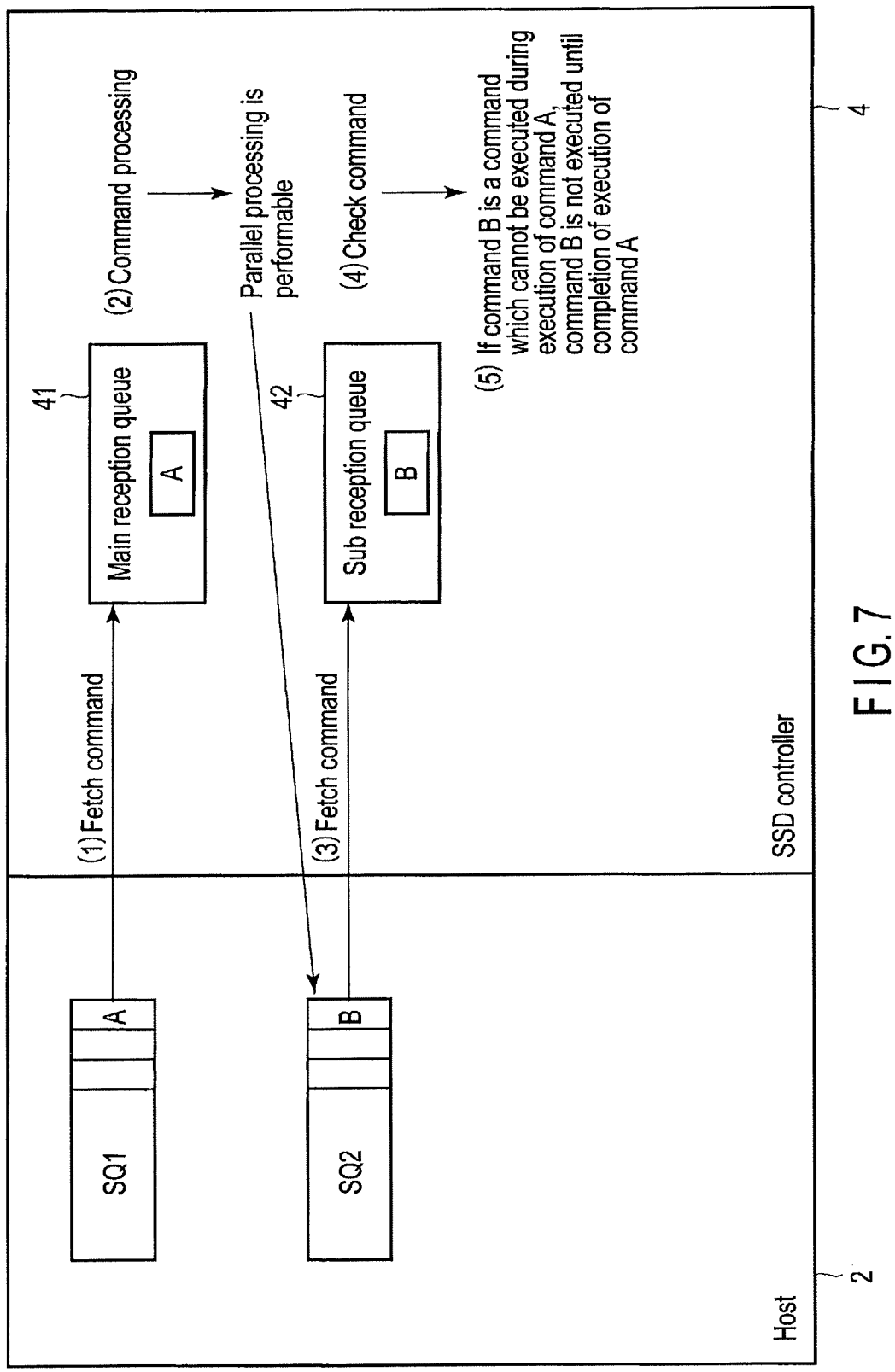
FIG. 7 is a view illustrating an operation of fetching a subsequent command during execution of a current command without using a command pre-check process.

FIG. 7 shows an operation of fetching a subsequent command during execution of a current command without using the above command pre-check process.

In the host 2, commands to be executed by the SSD 3 are posted in submission queues SQ. FIG. 7 shows an example where a command A is posted in a submission queue SQ1 and a command B is posted in a submission queue SQ2. When the commands are posted in the submission queues SQ, a notice that there are new commands in the submission queues SQ is sent to the SSD 3.

In the SSD 3, a submission queue from which a command is fetched is selected from a plurality of submission queues SQ1 an SQ2. FIG. 7 shows an example where the submission queue SQ1 is selected.

(1) Fetch of Command

The controller 4 of the SSD 3 fetches one or more commands from the selected submission queue orderly using the command transmission/reception unit 22. The command fetched (here, command A) is posted in the main reception queue 41 of the SSD 3. When the command is to be fetched, the commands of number designated by the burst size may be fetched at once. Or, a cycle including an operation of fetching a command and an operation of processing the fetched command may be repeated until the number of commands fetched reaches the number designated by the burst size. If commands of number designated by the burst size are fetched from one submission queue, a submission queue from which commands are fetched is newly selected by the arbitration mechanism 21.

For example, after the commands of number designated by the burst size are fetched from the submission queue SQ1, the submission queue from which commands are fetched is switched to the submission queue SQ2, and commands are fetched from the submission queue SQ2. Furthermore, after the commands of number designated by the burst size are fetched from the submission queue SQ2, the submission queue from which commands are fetched is switched to the submission queue SQ1, and subsequent commands are fetched from the submission queue SQ1.

(2) Command Processing

Then, the controller 4 of the SSD 3 executes the fetched command (here, command A). Furthermore, during the execution of the command A, the controller 4 of the SSD 3 determines whether or not the command A can be executed in parallel to other commands (that is, whether or not parallel processing is performable). If the command A is a type of command to be exclusively executed, it is determined that the command A cannot be subjected to a parallel process. On the other hand, if the command A is not a type of command to be exclusively executed, it is determined that the command A can be subjected to a parallel process.

Note that the determination may be executed only when a time required for processing of the command A is longer than threshold t1.

(3) Fetch of Subsequent Command

If parallel processing is performable, the controller 4 of the SSD 3 fetches a subsequent command from the submission queue from which the command A is fetched or another submission queue (a different submission queue). For example, if the number of commands fetched from the currently selected submission queue is less than the number designated by the burst size, a subsequent command may be fetched from the same submission queue. In that case, the controller 4 of the SSD 3 fetches the subsequent command from an entry of the submission queue pointed by the head pointer corresponding to the same queue. On the other hand, after the number of commands fetched from the currently selected submission queue reaches the number designated by the burst size, a subsequent command may be fetched from a different submission queue newly selected by the arbitration mechanism 21. If the tail pointer is equal to the head pointer in the submission queue newly selected, the submission queue is skipped and a next submission queue is newly selected by the arbitration mechanism 21. If commands are posted in the newly selected submission queue, a subsequent command is fetched from an entry of the submission queue pointed by the head pointer corresponding to the newly selected submission queue. FIG. 7 shows an example where a subsequent command (here, command B) is fetched from the submission queue SQ2. The command fetched (here, command B) is posted in the sub reception queue 42 of the SSD 3.

(4) Command Check

Then, the controller 4 of the SSD 3 analyzes the subsequent command fetched (command B) and determines whether or not the subsequent command fetched (command B) is a command which can be executed during the execution of the current command (command A).

(5) Operation on the Basis of Check Result

As a result of a command check, if the command B is a command which is executable during the execution of the command A, the controller 4 of the SSD 3 executes the command B in the sub reception queue 42 without waiting for the completion of the execution of the current command (command A). That is, the commands A and B are executed in parallel.

On the other hand, if the command B is not a command which is executable during the execution of the command A, the command B is not executed until the completion of the execution of the command A.

As can be understood from the above, even if a subsequent command is fetched during execution of a current command, the subsequent command may not be executed in parallel to the command currently executed depending on types of the subsequent command fetched.

Figure 8:
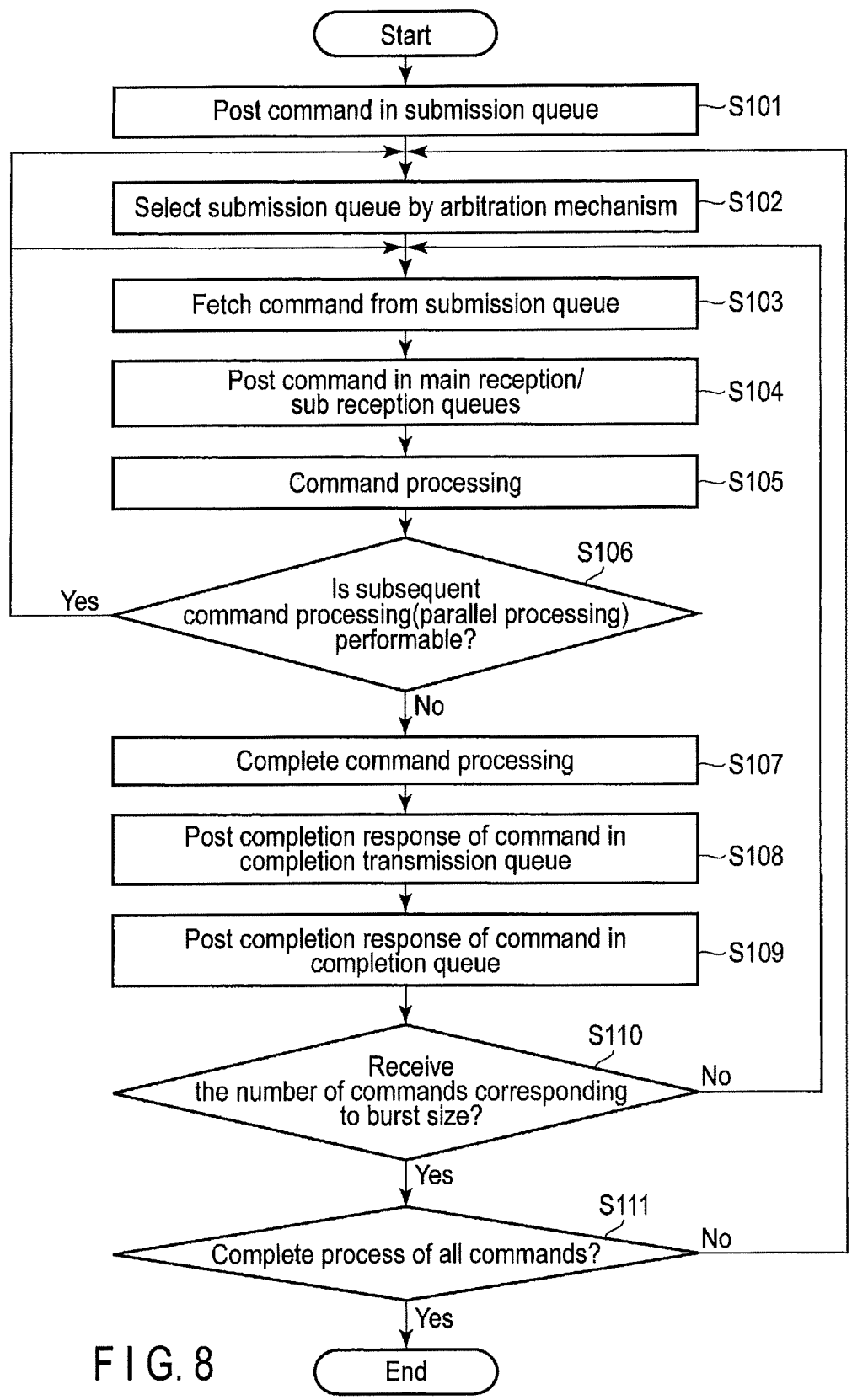
FIG. 8 is a flowchart illustrating a procedure of command processing in a case where a command pre-check process is not used.

FIG. 8 shows a flowchart showing command processing in a case where the above command pre-check process is not used.

In the host 2, commands to execute a certain operation in the SSD 3 are posted in a submission queue (step S101). When the commands are posted in the submission queue, notice that there are new commands in the submission queue SQ is sent to the SSD 3.

In the SSD 3, a submission queue from which a command is fetched is selected using the arbitration mechanism 21 (step S102). Then, the command processing unit 31 fetches one or more commands from the selected submission queue using the command transmission/reception unit 22 (step S103). The commands fetched are posted in the main reception queue 41 (step S104). Then, the command processing unit 31 executes the commands in the main reception queue 41 (step S105).

Then, whether or not the command currently executed is executed in parallel to another command is determined (step S106).

If the command currently executed is determined to be executed in parallel to another command (YES in step S106), subsequent command is fetched from the submission queue from which the command currently executed is fetched or a different submission queue (step S102 or step S103).

The subsequent command fetched is posted in the sub reception queue 42 (step S104). Whether or not the subsequent command posted in the sub reception queue 42 is a command which is executable during the execution of the current command is determined by the command processing unit 31. If the subsequent command is a command which is executable during the execution of the current command, the subsequent command and the current command are executed in parallel. On the other hand, if the subsequent command is not a command which is executable during the execution of the current command, the subsequent command is not executed until the execution of the current command is completed.

If the command currently executed is determined not to be executed in parallel to another commands (NO in step S106), the subsequent command is not fetched, and the execution of the current command continues.

After the completion of the execution of the current command (step S107), a response of command completion is posted in the completion transmission queue 43 (step S108), and the response of command completion is posted in the completion queue (step S109).

Then, in the SSD 3, whether or not the number of commands fetched from the currently selected submission queue reaches the number designated by the burst size is determined (step S110).

If the number of commands fetched from the currently selected submission queue does not reach the number designated by the burst size (NO in step S110), subsequent commands are fetched from the currently selected submission queue (step S103).

On the other hand, if the number of commands fetched from the currently selected submission queue reaches the number designated by the burst size (YES in step S110), whether or not all commands in the submission queues of the host 2 are processed is determined (step S111).

If the all commands are processed (YES in step S110), the process of this flowchart ends.

On the other hand, if there is an unprocessed command in the commands of the entire submission queues (NO in step S111), the process of this flowchart returns to step S102.

Now, command processing including a command pre-check executed by the SSD 3 of the present embodiment will be explained.

In the present embodiment, during a time waiting for the completion of the execution of the current command, a pre-check process is performed to determine a type of a subsequent command of a submission queue SQ on the host memory, and thereby whether or not the subsequent command is a command which is executable during the execution of the current command can be determined before receiving the subsequent command. Hereinafter, an outline of command processing including a command pre-check will be explained.

(1) The controller 4 of the SSD 3 fetches commands from a submission queue SQ and starts processing of the commands.

(2) If the command can be executed in parallel to other commands, or if the command can be executed in parallel to other commands and a time required for processing of the commands is longer than a threshold t1, (a) the controller 4 of the SSD 3 pre-checks a subsequent command in the submission queue from which the currently executed command is fetched or in a different submission queue while leaving the subsequent command in the submission queue or in the different submission queue.

(b) If the subsequent command is a command which is executable during the execution of the current command, (i) the controller 4 fetches the subsequent command to the sub reception queue 42 and processes the subsequent command.

(c) If the subsequent command is not a command which is executable during the execution of the current command, (i) the controller 4 does not perform any operation.

(3) If the current command cannot be executed in parallel to other commands, or if the current command can be executed in parallel to other commands but a time required for processing of the current commands is less than a threshold t1, (a) the controller 4 does not perform any operation.

As can be understood from the above, in the present embodiment, a subsequent command is checked while being left in the submission queue, and whether or not the subsequent command is a command which is executable during the execution of the current command is determined before the subsequent command is actually fetched. Thus, a subsequent command is not a command which is executable during the execution of the current command is prevented from being fetched from a submission queue to the sub reception queue 42. Furthermore, a command execution time which can be allocated to the processing of the subsequent command can be prevented from being shortened.

Since further detailed command control is performable in the present embodiment, the following advantage can be expected.

<Improved Abort Command Function>

The controller 4 can preliminarily check whether or not there is an abort command in a submission queue SQ by pre-checking the submission queue SQ. If there is an abort command in the submission queue SQ, the controller 4 can preliminarily stop processing of a command to be aborted by the abort command.

<Speedup of Process Determination of Commands (Fused Operation) Requiring Sequential Execution>

In commands requiring sequential execution, processing of commands must be stopped if there are contradict command parameters between the commands. The controller 4 can preliminarily check the consistency of the command parameters between the commands requiring sequential execution (fused operation) by pre-checking the submission queue SQ. If these command parameters are contradict between the commands, the controller 4 can rapidly determine stopping the processing of the commands.

<Flexible Command Processing>

If commands of number designated by the burst size are fetched from a submission queue SQ to the main reception queue 41 and a long period of time is required to execute at least one of the commands, the controller 4 pre-checks a different submission queue SQ to fetch a command which can be executed in parallel to the currently executed command from the different submission queue SQ to the sub reception queue 42. Thus, the efficiency of the command processing can be improved.

Figure 9:
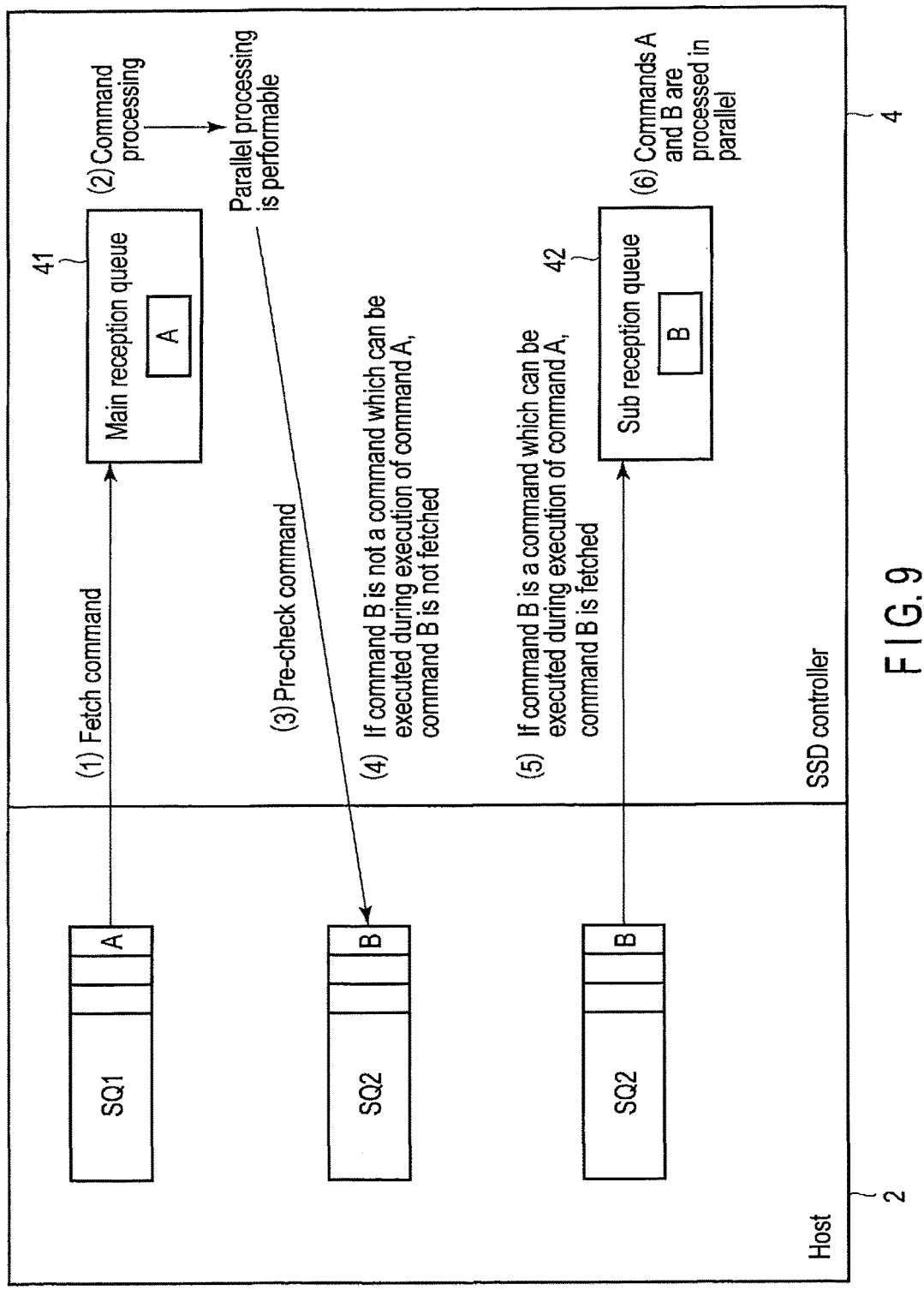
FIG. 9 is a view illustrating an example of command processing including command pre-check, executed by the memory system of the embodiment.

FIG. 9 shows an example of command processing including a command pre-check.

In the host 2, commands to be executed by the SSD 3 are posted in submission queues SQ. FIG. 9 shows an example where a command A is posted in a submission queue SQ1 and a command B is posted in a submission queue SQ2. When commands are posted in the submission queues SQ, a notice that there are new commands in the submission queues SQ is sent to the SSD 3.

In the SSD 3, a submission queue from which a command is fetched is selected from a plurality of submission queues SQ1 and SQ2. FIG. 9 shows an example where the submission queue SQ1 is selected.

(1) Fetch of Command

The controller 4 of the SSD 3 fetches one or more commands from the selected submission queue orderly using the command transmission/reception unit 22. The command fetched (here, command A) is posted in the main reception queue 41 of the SSD 3. When the command is to be fetched, the commands of number designated by the burst size may be fetched at once. Or, a cycle including an operation of fetching a command and an operation of processing the fetched command may be repeated until the number of commands fetched reaches the number designated by the burst size. If commands of number designated by the burst size are fetched from one submission queue, a submission queue from which commands are fetched is newly selected by the arbitration mechanism 21.

(2) Command Processing

Then, the controller 4 of the SSD 3 executes the fetched command (here, command A). Furthermore, during the execution of the command A, the controller 4 of the SSD 3 determines whether or not the command A can be executed in parallel to other commands (that is, whether or not parallel processing is performable). Note that the determination may be executed only when a time required for processing of the command A is longer than threshold t1.

(3) Command Pre-Check

If parallel processing is performable, the command pre-check unit 32 pre-checks a subsequent command in the submission queue (submission queue SQ1) from which the currently executed command (here, command A) is fetched or in a different submission queue (submission queue SQ2). The subsequent command is a head command in the submission queue SQ1 or a head command in the submission queue SQ2. For example, if the number of commands fetched from the currently selected submission queue is less than the number designated by the burst size, a subsequent command (head command) in the same submission queue may be pre-checked. In that case, the controller 4 of the SSD 3 pre-checks the subsequent command in an entry of the submission queue pointed by the head pointer corresponding to the same queue. On the other hand, after the number of commands fetched from the currently selected submission queue reaches the number designated by the burst size, a subsequent command (head command) from a different submission queue newly selected by the arbitration mechanism 21 may be pre-checked. In that case, the command pre-check unit 32 pre-checks the subsequent command stored in an entry of the newly selected submission queue pointed by the head pointer corresponding to the newly selected submission queue.

FIG. 9 shows an example where the command B in the submission queue SQ2 is pre-checked. In the process of pre-checking the subsequent command, the command pre-check unit 32 checks contents of the subsequent command (here, command B in the submission queue SQ2) while leaving the subsequent command in the submission queue SQ2 to determine whether or not the subsequent command (command B) is a command which is executable during the execution of the current command (here, command A). For example, the command pre-check unit 32 refers to the entry in the submission queue SQ2 pointed by the head pointer corresponding to the submission queue SQ2 without updating the head pointer. Thus, the entry does not become empty and the subsequent command is maintained in the entry. In the process of referring to the entry, the command pre-check unit 32 may read only a part of the data in the entry. For example, only an operation code may be read from the entry, or only the operation code and a part of command parameters (for example, data length, starting LBA, etc.) may be read from the entry.

Then, the command pre-check unit 32 determines, on the basis of the result of pre-check, whether or not the subsequent command (command B) is a command which is executable during the execution of the current command (command A).

(4) No Fetch Process

If the subsequent command (command B) is not a command which is executable during the execution of the current command (command A), the subsequent command (command B) is not fetched. In the example of FIG. 9, the command B is not fetched from the submission queue SQ2 and is maintained in the submission queue SQ2.

(5) Execution of Fetch Process

If the subsequent command (command B) is a command which is executable during the execution of the current command (command A), the subsequent command (command B) is fetched. In the example of FIG. 9, the command B is fetched from the submission queue SQ2. In that case, the head pointer corresponding to the submission queue SQ2 is updated. The subsequent command (command B) fetched is posted in the sub reception queue 42.

(6) Parallel Process

Then, the controller 4 of the SSD 3 executes the command B put in the sub reception queue 42 without waiting for the completion of the currently executed command (command A). That is, the commands A and B are executed in parallel.

Note that, in a case where commands A, B, and C are fetched from the submission queue SQ1 to the main reception queue 41 and the commands A, B, and C are executed by the command processing unit 31, whether or not there are commands which can be executed in parallel to the commands A, B, and C are in the submission queue SQ1 or SQ2 may be determined. For example, if commands D, E, and F posted in the submission queue SQ2 are commands which are executable during the execution of the commands A, B, and C, the commands D, E, and F may be fetched from the submission queue SQ2 to the sub reception queue 42 and the commands A, B, C, D, E, and F may be executed in parallel.

FIG. 10 shows another example of command process including a command pre-check, executed by the memory system of the present embodiment.

In the host 2, commands to be executed by the SSD 3 are posted in submission queues SQ. FIG. 10 shows an example where a command A is posted in a submission queue SQ1, a command B is posted in a submission queue SQ2, and a command C is posted in a submission queue SQ3. When commands are posted in the submission queues SQ, a notice that there are new commands in the submission queues SQ is sent to the SSD 3.

In the SSD 3, a submission queue from which a command is fetched is selected from a plurality of submission queues SQ1, SQ2, and SQ3 in order to process the commands posted in the submission queues SQ1, SQ2, and SQ3. FIG. 10 shows an example where the submission queue SQ1 is selected.

(1) Fetch of Command

When a submission queue is selected by the arbitration mechanism 21, the controller 4 of the SSD 3 fetches one or more commands from the selected submission queue using the command transmission/reception unit 22. The command fetched (here, command A) is posted in the main reception queue 41 of the SSD 3. When the command is to be fetched, the commands of number designated by the burst size may be fetched at once. Or, a cycle including an operation of fetching a command and an operation of processing the fetched command may be repeated until the number of commands fetched reaches the number designated by the burst size.

(2) Command Processing

Then, the controller 4 of the SSD 3 executes the fetched command (here, command A). Furthermore, during the execution of the command A, the controller 4 of the SSD 3 determines whether or not the command A can be executed in parallel to other commands (that is, whether or not parallel processing is performable. Note that the determination may be executed only when a time required for processing of the command A is longer than threshold t1.

(3) Command Pre-Check

If parallel processing is performable, the command pre-check unit 32 pre-checks a subsequent command in the submission queue (submission queue SQ1) from which the currently executed command (here, command A) is fetched or in a different submission queue (submission queue SQ2 or submission queue SQ3). FIG. 10 shows an example where the command B in the submission queue SQ2 is pre-checked. In the process of pre-checking the subsequent command, the command pre-check unit 32 checks contents of the subsequent command (here, command B in the submission queue SQ2) while leaving the subsequent command in the submission queue SQ2 to determine whether or not the subsequent command (command B) is a command which is executable during the execution of the current command (here, command A). For example, the command pre-check unit 32 refers to the entry in the submission queue SQ2 pointed by the head pointer corresponding to the submission queue SQ2 without updating the head pointer. Thus, even if the entry is referred to, the subsequent command (command B) is maintained in the entry. In the process of referring to the entry, the command pre-check unit 32 may read only a part of the data in the entry from the host memory.

Then, the command pre-check unit 32 determines, on the basis of the result of pre-check, whether or not the subsequent command (command B) is a command which is executable during the execution of the current command (command A).

(4) Pre-Check of Command in Different Submission Queue

If the subsequent command (command B) is not a command which is executable during the execution of the current command (command A), the subsequent command (command B) is not fetched and the command pre-check unit 32 pre-checks a subsequent command (command C) in another submission queue (submission queue SQ3). Then, the command pre-check unit 32 determines, on the basis of the result of the pre-check, whether or not the subsequent command (command C) is a command which is executable during the execution of the current command (command A). In the process of pre-checking the subsequent command (command C) of the submission queue SQ3, the command pre-check unit 32 checks contents of the subsequent command (here, command C in the submission queue SQ3) while leaving the subsequent command in the submission queue SQ3 to determine whether or not the subsequent command (command C) is a command which is executable during the execution of the current command (here, command A). For example, the command pre-check unit 32 refers to the entry in the submission queue SQ3 pointed by the head pointer corresponding to the submission queue SQ3 without updating the head pointer. Thus, even if the entry is referred to, the subsequent command is maintained in the entry. In the process of referring to the entry, the command pre-check unit 32 may read only a part of the data in the entry from the host memory.

(5) Execution of Fetch Process

If the subsequent command (command C) is a command which is executable during the execution of the current command (command A), the subsequent command is fetched. In the example of FIG. 10, the command C is fetched from the submission queue SQ3. The subsequent command (command C) fetched is posted in the sub reception queue 42.

(6) Parallel Process

Then, the controller 4 of the SSD 3 executes the command C put in the sub reception queue 42 without waiting for the completion of the currently executed command (command A). That is, the commands A and C are executed in parallel.

Note that, in a case where commands A, B, and C are fetched from the submission queue SQ1 to the main reception queue 41 and the commands A, B, and C are executed by the command processing unit 31, whether or not there are commands which can be executed in parallel to the commands A, B, and C are in the submission queue SQ2 or SQ3 may be determined. For example, initially, commands D, E, and F posted in the submission queue SQ2 are pre-checked and whether or not the commands D, E, and F are commands which are executable during the execution of the commands A, B, and C is determined. If the commands D, E, and F are not a command group which can be executed during the execution of the commands A, B, and C, commands G, H, and I posted in the submission queue SQ3 are pre-checked, and whether or not the commands G, H, and I are commands which are executable during the execution of the commands A, B, and C may be determined. If the commands G, H, and I can be executed during the execution of the commands A, B, and C, the commands G, H, and I may be fetched from the submission queue SQ3 to the sub reception queue 42 and the commands A, B, C, G, H, and I may be executed in parallel.

FIG. 11 shows a command pre-check operation executed by the memory system of the present embodiment.

(1) The controller 4 of the SSD 3 pre-checks a command stored in an entry of the submission queue SQ pointed by the head pointer. At that time, the controller 4 of the SSD 3 refers to an entry in the submission queue SQ pointed by the head pointer without updating the head pointer.

(2) On the basis of the result of the pre-check, if the pre-checked command is a command which is executable during the execution of the current command, the controller 4 of the SSD 3 fetches the command from the entry in the submission queue SQ pointed by the head pointer and stores the fetched command in the sub reception queue 42.

(3) The controller 4 of the SSD 3 updates (increments) the value of head pointer. The host 2 can handle the entry pointed by the value of the past head pointer as an empty entry.

Figure 12:
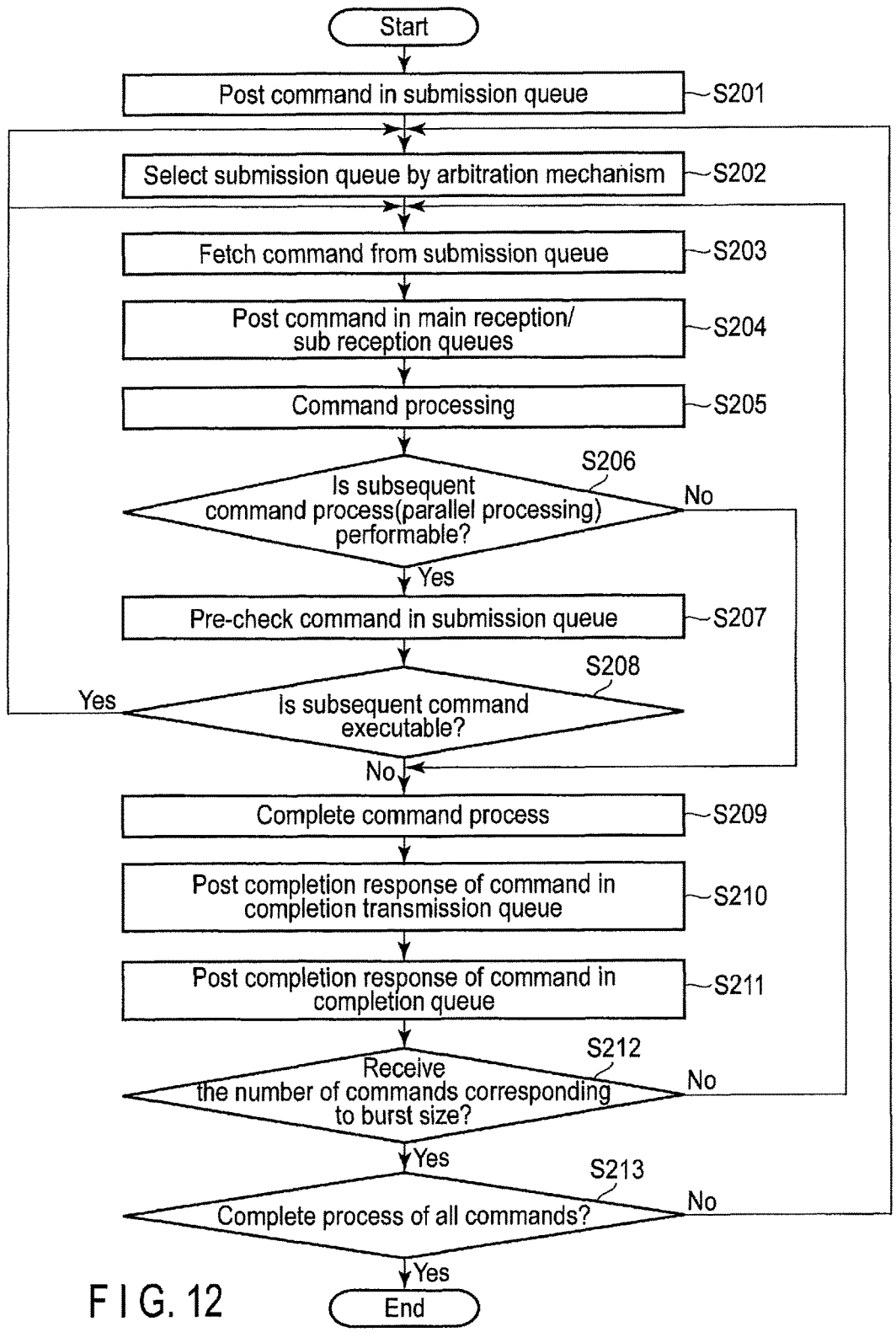
FIG. 12 is a flowchart illustrating a procedure of command processing including command pre-check, executed by the memory system of the embodiment.

FIG. 12 shows a flowchart of command processing of the present embodiment.

In the host 2, commands to execute a certain operation in the SSD 3 are posted in a submission queue (step S201). When the commands are posted in the submission queue SQ, an updated value of a tail pointer is written in a register in the controller 4 (doorbell tail register corresponding to the submission queue SQ) by the host 2, and a notice that there are new commands in the submission queue SQ is sent to the SSD 3.

In the SSD 3, a submission queue from which a command is fetched is selected from a plurality of submission queues SQ1, SQ2, SQ3 . . . using the arbitration mechanism 21 (step S202). Then, the command processing unit 31 fetches one or more commands from the selected submission queue using the command transmission/reception unit 22 (step S203). In step S203, a command is fetched from an entry of the selected submission queue SQ pointed by the head pointer corresponding to the selected submission queue SQ. The command fetched is posted in the main reception queue 41 (step S204). Then, the command processing unit 31 analyzes the command in the main reception queue 41 and executes the command (step S205). Then, whether or not the current command (command currently executed) can be executed in parallel to other commands is determined (step S206).

If the current command is determined to be executable in parallel to other commands (YES in step S206), the command pre-check unit 32 pre-checks a subsequent command in the submission queue from which the command currently executed is fetched or in a different submission queue (step S207). In step S207, the command pre-check unit 32 refers to the entry pointed by the head pointer corresponding to the submission queue of pre-check target without updating the head pointer and checks contents of the subsequent command while leaving the subsequent command in the submission queue of pre-check target. In step S207, the command pre-check unit 32 may read a part of data in the entry alone from the entry pointed by the head pointer.

Then, the command pre-check unit 32 determines, on the basis of the result of pre-check, whether or not the subsequent command is a command which is executable during the execution of the current command (step S208).

If the subsequent command is a command which is executable during the execution of the current command (YES in step S208), the subsequent command is fetched. IF the subsequent command is a command in the same submission queue, the subsequent command is fetched in step S203. On the other hand, if the subsequent command is a command in a different submission queue, the subsequent command may be fetched from the different submission queue after the different submission queue is selected by the arbitration mechanism 21 (steps S203 and S203). Then, a value of the head pointer corresponding to the submission queue of the pre-check target, and the entry pointed by the value of past pointer is released. The fetched subsequent command is posted in the sub reception queue 42 (step S204), and the fetched subsequent command and the current command are executed in parallel (step S205).

On the other hand, if the subsequent command is not a command which is executable during the execution of the current command (NO in step S208), the pre-checked subsequent command is not fetched. The value of the head pointer corresponding to the submission queue of the pre-check target is not updated.

IF the current command is not a command which can be executed in parallel to other commands (NO in step S206), the pre-check of the subsequent command is not performed, and the process of the current command is continued.

After the completion of the execution of the current command (step S209), a response of command completion is posted in the completion transmission queue 43 (step S210), and the response of command completion is posted in the completion queue (step S211).

Then, in the SSD 3, whether or not the number of commands fetched from the currently selected submission queue and executed reaches the number designated by the burst size is determined (step S212).

If the number of commands fetched from the currently selected submission queue and executed does not reach the number designated by the burst size (NO in step S212), subsequent commands are fetched from the currently selected submission queue (step S203).

On the other hand, if the number of commands fetched from the currently selected submission queue and executed reaches the number designated by the burst size (YES in step S212), whether or not all commands in the submission queues of the host 2 are processed is determined (step S213).

If the all commands are processed (YES in step S213), the process of this flowchart ends.

On the other hand, if there is an unprocessed command in the commands of the entire submission queues (NO in step S213), the process of the flowchart returns to step S202.

In step S208 above, on the basis of the result of pre-check, if the subsequent command is determined to be not executable in parallel to the currently executed commands, a command which can be executed in parallel to the currently executed commands may be retrieved from the entire commands in the entire submission queues in the host 2. Then, if there is a subsequent command which can be executed in parallel to the currently executed commands, the subsequent command may be fetched and the fetched subsequent command and the currently executed commands may be executed in parallel. In that case, if the subsequent command which can be executed in parallel to the currently executed commands is not a head command in a submission queue, commands from the head command to the subsequent command may be fetched altogether, and then, only the subsequent command may be executed in parallel to the currently executed command. For example, if commands A, B, and C are posted in this order in a submission queue and the command A is currently being executed while the command B is not a command executable in parallel to the command A but the next command C is executable in parallel to the command A, the commands B and C may be fetched together and only the command C may be executed in parallel to the command A.

If there is not a subsequent command which can be executed in parallel to the currently executed commands, a subsequent command is not fetched until the completion of the execution of the currently executed command.

As can be understood from the above, in the present embodiment, during execution of a current command, contents of a subsequent command in a submission queue from which the current command is fetched or in a different submission queue are checked while maintaining the subsequent command in the same submission queue or the different submission queue. Here, the checking can be performed by referring to an entry of the same submission queue or in the different submission queue pointed by the head pointer corresponding to the same submission queue or to the different submission queue without updating the head pointer. If the subsequent command is a command which can be executed by the execution of the current command, the subsequent command is fetched from the same submission queue or from the different submission queue to the sub reception queue 42, and the subsequent command and the current command are executed in parallel.

As can be understood from the above, in the present embodiment, a subsequent command is checked while being left in the submission queue and whether or not the subsequent command can be executed during the execution of the current command is determined before the subsequent command is actually fetched. Thus, a subsequent command which cannot be executed during the execution of the current command is prevented from being fetched from a submission queue to the sub reception queue 42, and an overhead process caused by frequently switching the reception queue for execution can be decreased. Furthermore, a command execution time can be prevented from being shortened. As a result, a command handling function can be improved, and command processing performance of the SSD 3 can be improved.

Note that, in the present embodiment, a NAND flash memory is used as an example of the nonvolatile memory. However, the present embodiment can be applied to various nonvolatile memories such as magnetoresistive random access memory (MRAM), phase change random access memory (PRAM), resistive random access memory (ReRAM), or ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable a host, the memory system comprising:
   a nonvolatile memory; and
   a controller electrically connected to the nonvolatile memory and configured to control the nonvolatile memory, wherein
   the controller is further configured to:
   fetch a first command in a submission queue on a memory of the host to a first queue in the memory system;
   execute the first command;
   check contents of a subsequent command in the submission queue or another submission queue on the memory of the host during the execution of the first command while leaving the subsequent command in the submission queue or said another submission queue; and
   fetch the subsequent command from the submission queue or said another submission queue to a second queue in the memory system and execute the subsequent command and the first command in parallel, when the subsequent command is a command executable during the execution of the first command.

2. The memory system of claim 1, wherein the controller is configured to refer to an entry of the submission queue or of said another submission queue pointed by a head pointer corresponding to the submission queue or to said another submission queue without updating the head pointer to check the contents of the subsequent command while leaving the subsequent command in the submission queue or said another submission queue.

3. The memory system of claim 2, wherein the controller is further configured to fetch the subsequent command and update the head pointer corresponding to the submission queue or the said another submission queue, when the subsequent command is a command executable during the execution of the first command.

4. The memory system of claim 1, wherein the controller is further configured to not fetch the subsequent command from the submission queue or said another submission queue, when the subsequent command is not a command executable during the execution of the first command.

5. The memory system of claim 1, wherein the first queue and the second queue exist on a random access memory in the memory system.

6. A memory system connectable to a host, the memory system comprising:
   a nonvolatile memory; and
   a controller electrically connected to the nonvolatile memory and configured to control the nonvolatile memory, wherein
   the controller is further configured to:
   fetch a first command in a first submission queue on a memory of the host to a first queue in the memory system;
   execute the first command;
   check contents of a first subsequent command in a second submission queue on the memory of the host during the execution of the first command while leaving the first subsequent command in the second submission queue;
   fetch the first subsequent command from the second submission queue to a second queue in the memory system and execute the first subsequent command and the first command in parallel, when the first subsequent command is a command which is executable during the execution of the first command;
   check contents of a second subsequent command in a third submission queue on the memory of the host while leaving the second subsequent command in the third submission queue, when the first subsequent command is not a command which is executable during the execution of the first command; and
   fetch the second subsequent command from the third submission queue to the second queue and execute the second subsequent command and the first command in parallel, when the second subsequent command is a command which is executable during the execution of the first command.

7. The memory system of claim 6, wherein the controller is further configured to:
   refers to an entry in the second submission queue pointed by a head pointer corresponding to the second submission queue without updating the head pointer corresponding to the second submission queue to check the contents of the first subsequent command while leaving the first subsequent command in the second submission queue; and
   refer to an entry in the third submission queue pointed by a head pointer corresponding to the third submission queue without updating the head pointer corresponding to the third submission queue to check contents of the second subsequent command while leaving the second subsequent command in the third submission queue, when the first subsequent command is not a command which is executable during the execution of the first command.

8. A method executed by a memory system including a nonvolatile memory and a controller configured to control the nonvolatile memory, the method comprising:
   fetching a first command in a submission queue on a memory of a host to a first queue in the memory system;
   executing the first command;

checking contents of a subsequent command in the submission queue or another submission queue on the memory of the host during the execution of the first command while leaving the subsequent command in the submission queue or said another submission queue; and fetching the subsequent command from the submission queue or said another submission queue to a second queue in the memory system and executing the subsequent command and the first command in parallel, when the subsequent command is a command executable during the execution of the first command.

9. The method of claim 8, wherein the checking of contents of the subsequent command while leaving the subsequent command in the submission queue or in said another submission queue includes referring to an entry in the submission queue or a different submission queue pointed by a head pointer corresponding to the submission queue or said another submission queue without updating the head pointer.

10. The method of claim 9, wherein when the subsequent command is a command executable during the execution of the first command, the subsequent command is fetched and the head pointer is updated.

* * * * *